Oct. 6, 1925.
R. N. DICKEY
1,556,206
DETACHABLE CAN SPOUT AND OPENER
Filed April 26, 1923
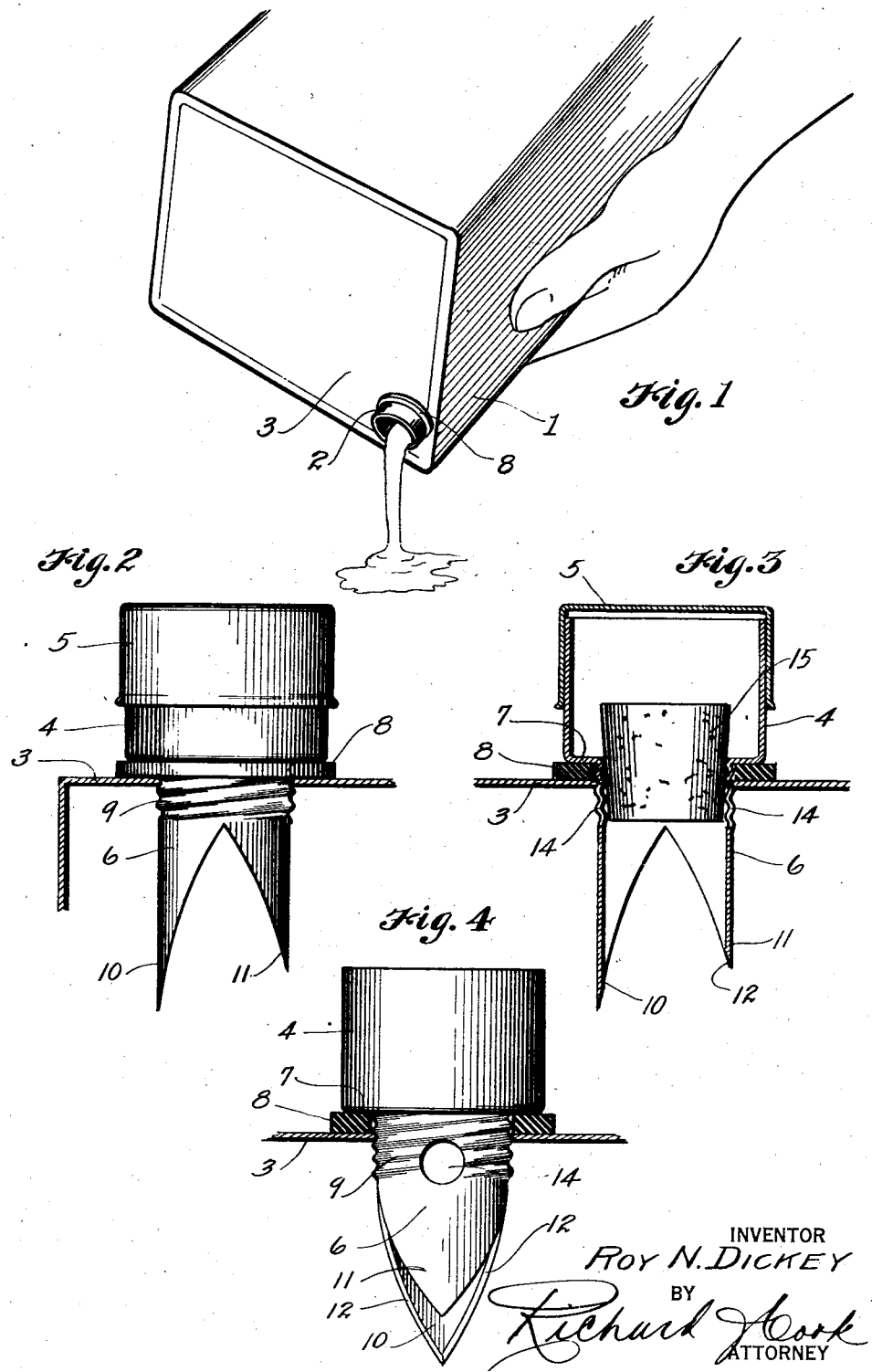
INVENTOR
Roy N. Dickey
BY
Richard J. Cook
ATTORNEY Patented Oct. 6, 1925.

1,556,206

UNITED STATES PATENT OFFICE.

ROY N. DICKEY, OF SEATTLE, WASHINGTON, ASSIGNOR TO MEETS-A-NEED MANUFACTURING CO., A CORPORATION.

DETACHABLE CAN SPOUT AND OPENER.

Application filed April 26, 1923. Serial No. 634,747.

*To all whom it may concern:*

Be it known that I, ROY N. DICKEY, a citizen of the United States, and a resident of Seattle, King County, Washington, have invented certain new and useful Improvements in Detachable Can Spouts and Openers, of which the following is a specification.

This invention relates to a detachable spout and can opener, and more particularly to improvements in devices of that character particularly useful for decanting liquids from sealed metallic cans; the principal object of this invention being to provide a detachable pouring spout with an integrally formed tubular shank for cutting an opening in the container to receive the spout and having means thereon for securely holding the spout in fixed relation to the container.

Another object is to provide a device of the above character wherein the pouring spout is of greater diameter than the cutting shank and forms an annular shoulder that serves as an abutment for a sealing washer, and wherein the shank has a threaded portion providing means whereby the washer may be tightened against the can wall to prevent any possible leakage.

A still further object resides in the provision of piercing points of different length at opposite sides of the cutting shank in order that the insertion of the device when the hole therefor is formed may be made as easy as possible.

Another object of the invention resides in the provisions of openings through the shank close to the spout whereby draining of the entire contents from a can is made possible.

Other objects reside in the various details of construction and combination of parts embodied in the invention and in the manner in which such devices are applied.

In accomplishing these objects, I have provided the improved details of construction, the preferred forms of which are illustrated in the accompanying drawings, wherein—

Figure 1 is a perspective view showing a can equipped with a detachable spout constructed and applied in accordance with the present invention.

Figure 2 is a side view of the device as applied to a can wall.

Figure 3 is a central sectional view of the same.

Figure 4 is a side view showing the drainage ports through the threaded part of the cutting shank.

Referring more in detail to the drawings—

1 designates a container which may be of the sealed, metallic type such as those commonly used for syrup, oil, and similar substances, and 2 designates, in its entirety, a detachable spout and opener, embodying the present invention, that is applied to an end wall 3 of the container.

The device 2 comprises a pouring spout 4 preferably of cylindrical form with an open upper end over which a cover or cap 5 is removably fitted; the latter serving as a means for retaining the spout clean and also, in case no stopper is used in the device, as means for preventing the entrance of any foreign substance into the container through the spout.

Formed integral with the spout 4 and extending concentrically from the base thereof, is a tubular shank 6; this is of smaller diameter than the spout and provides an annular shoulder or abutment 7 against which a gasket or washer 8, of rubber or any other suitable material, is seated. That portion of the shank adjacent the spout is provided exteriorly and interiorly with screw threads 9 which are pressed outwardly from the shank so that the outside diameter of the threaded portion is greater than the outside diameter of the lower portion, which enters the can first when the device is applied.

The lower part of the shank 6 terminates in two oppositely disposed piercing points 10 and 11, which are of considerable length, but preferably with the point 10 extended farther than the point 11 so they will not both enter a can wall at the same time, thus insuring easier application of the device. The opposite edges of the two piercing members, are sharpened from the inside of the device outwardly, as shown at 12, so that when the device is pressed through a can wall, the edges of the hole in the can wall will be left sharp and will not be downwardly crimped as would be the case if the cutting edges were beveled the opposite way.

In the opposite side walls of the shank, close to the spout, I have provided drainage ports 14 which will lie close to the can wall and through which contents of the can may flow into the spout, thereby insuring complete drainage.

If it is desired, a stopper, or cork 15 may be applied, as shown in Figure 3, to prevent leakage if the can is to be transported with the spout in place. The enlargement of the spout permits easy application or removal of the cork from the shank opening and permits the use of such a stopper without interfering with the use of the cap 5.

If it should be desired, the spout could be reinforced with ribs which would permit it to be driven into a can but for all ordinary uses, it can be made sufficiently heavy in the form illustrated to withstand the pressure required for its insertion.

It is also apparent that a pouring lip could be provided on the spout and that the form of the cover 5 could be changed to fit such a pouring lip.

With the device so constructed it would be applied to a can by pressing the piercing points 10 and 11 through the can wall up to the threaded portion, then by turning the spout, the threads will clamp the gasket tightly against the wall to prevent any possible leakage about the opening.

When the shank is pressed through the wall, it cuts out a circular piece which falls to the bottom of the container and being heavier than the contents thereof, remains at the bottom.

After the spout is thus attached, pouring from the container may be done in the ordinary manner upon the removal of cover 5 and stopper 15, which may be replaced and will effectively seal the container against leakage when in any position.

The pouring spout may be made of sufficient diameter that no other air vent need be made in the container to insure a ready flow.

Such a device can be made in various sizes, can be easily or quickly applied or removed, and can be used on different cans for an indefinite length of time. It is of simple construction, can be easily cleaned and kept sanitary and can be manufactured and sold at a relatively small cost.

Having thus described my invention, what I claim as new therein and desire to secure by Letters-Patent, is:

1. A device of the class described comprising a pouring spout with a tubular mounting shank of substantially lesser diameter joining the spout in an annular shoulder and terminating in two oppositely disposed piercing points adapted to make an opening for the shank in the wall of a container to which the device is applied; said shank being exteriorly threaded adjacent the spout for application to the container opening formed by the piercing points as a means for tightening the said annular shoulder against the can wall and being interiorly threaded to receive and retain a stopper therein.

2. A device of the class described comprising a pouring spout with a mounting shank of substantially lesser diameter extending centrally from and joining the spout in an annular shoulder and terminating at its end in two oppositely disposed piercing points with outwardly bevelled edges adapted to make an opening in the wall of the container equal in diameter to the outside diameter of the shank and a gasket located about the shank and against the shoulder; said shank being exteriorly threaded adjacent the spout for application to the container opening formed by the insertion of the piercing points and shank and being interiorly threaded to receive and retain a stopper.

Signed at Seattle, King County, Washington, this 20th day of April, 1923.

ROY N. DICKEY.